United States Patent
Sun

(10) Patent No.: US 11,865,937 B2
(45) Date of Patent: Jan. 9, 2024

(54) AUTOMATIC RECHARGING METHOD, DEVICE, STORAGE MEDIUM AND SYSTEM

(71) Applicant: Dreame Innovation Technology (Suzhou) Co., Ltd., Suzhou (CN)

(72) Inventor: Jiajia Sun, Suzhou (CN)

(73) Assignee: Dreame Innovation Technology (Suzhou) Co., Ltd., Suzhou (CN)

( * ) Notice: Subject to any disclaimer, the term of this patent is extended or adjusted under 35 U.S.C. 154(b) by 188 days.

(21) Appl. No.: 17/380,555

(22) Filed: Jul. 20, 2021

(65) Prior Publication Data
US 2022/0024333 A1    Jan. 27, 2022

(30) Foreign Application Priority Data

Jul. 21, 2020 (CN) .......................... 202010704916.0

(51) Int. Cl.
*B60L 53/37* (2019.01)
*G06T 7/73* (2017.01)
(Continued)

(52) U.S. Cl.
CPC ................ *B60L 53/37* (2019.02); *G06T 7/73* (2017.01); *B60L 2200/40* (2013.01);
(Continued)

(58) Field of Classification Search
CPC ........ B60L 53/37; B60L 2200/40; G06T 7/73; B60W 60/001; G05D 1/0225;
(Continued)

(56) References Cited

U.S. PATENT DOCUMENTS

| 10,575,696 B2* | 3/2020 | O'Brien ................ G05D 1/0234 |
| 2016/0309974 A1* | 10/2016 | Abe ......................... B60L 53/35 |

(Continued)

FOREIGN PATENT DOCUMENTS

| CN | 107450540 A | 12/2017 |
| CN | 107703933 A | 2/2018 |

(Continued)

OTHER PUBLICATIONS

Machine translation CN 110263601 (Year: 2019).*

(Continued)

*Primary Examiner* — Anne Marie Antonucci
*Assistant Examiner* — Misa H Nguyen
(74) *Attorney, Agent, or Firm* — Westbridge IP LLC

(57) ABSTRACT

Disclosed are an automatic recharging method, a device, a storage medium and a system, which belong to the field of computer technology. The method may include: starting an image acquisition component to acquire an automatic recharging image during an automatic recharging process; determining, when the automatic recharging image contains a feature identification, the relative positional relationship between a charging surface of a charging base and the automatic recharging device based on the position of the feature identification in the automatic recharging image; displaying the feature identification on the charging surface of the charging base; determining a movement direction of the automatic recharging device based on the relative positional relationship, to make the automatic recharging device move toward the charging surface of the charging base.

20 Claims, 5 Drawing Sheets

(51) Int. Cl.
B60W 60/00 (2020.01)
G05D 1/02 (2020.01)

(52) U.S. Cl.
CPC ......... *B60W 60/001* (2020.02); *G05D 1/0225* (2013.01); *G05D 1/0246* (2013.01); *G05D 2201/0203* (2013.01); *G05D 2201/0208* (2013.01)

(58) Field of Classification Search
CPC ......... G05D 1/0246; G05D 2201/0203; G05D 2201/0208; G05D 1/0234; G05D 1/12; Y02T 90/12; Y02T 10/70; Y02T 10/7072
See application file for complete search history.

(56) References Cited

U.S. PATENT DOCUMENTS

| | | | |
|---|---|---|---|
| 2019/0059677 A1* | 2/2019 | Huang | ............... A47L 11/24 |
| 2020/0030982 A1 | 1/2020 | Xiong et al. | |
| 2020/0077859 A1 | 3/2020 | Nien et al. | |

FOREIGN PATENT DOCUMENTS

| | | |
|---|---|---|
| CN | 108508897 A | 9/2018 |
| CN | 108646727 A | 10/2018 |
| CN | 109541535 A | 3/2019 |
| CN | 109975793 A | 7/2019 |
| CN | 110263601 A | 9/2019 |
| CN | 110353583 A | 10/2019 |
| CN | 111136648 A | 5/2020 |
| CN | 111198384 A | 5/2020 |
| CN | 111596694 B | 11/2020 |
| CN | 12327940 A | 2/2021 |
| EP | 1715398 A2 | 10/2006 |

OTHER PUBLICATIONS

David Yu et al. "Road Feature Dectection & GeoTagging with Deep Learning", Jun. 6, 2019. (Year: 2019).*

First Office Action issued in counterpart Chinese Patent Application No. 202010704916.0, dated Sep. 3, 2020.

International Search Report issued in corresponding PCT Application No. PCT/CN2021/107229, dated Oct. 18, 2021.

Notification to Grant Patent Right for Invention issued in counterpart Chinese Patent Application No. 202010704916.0, dated Oct. 15, 2020.

Second Office Action issued in counterpart Chinese Patent Application No. 202010704916.0, dated Sep. 29, 2020.

* cited by examiner

AUTOMATIC RECHARGING METHOD, DEVICE, STORAGE MEDIUM AND SYSTEM

CROSS-REFERENCE TO RELATED APPLICATIONS

This application claims priority to Chinese Patent Application CN202010704916.0, filed on Jul. 21, 2020, the entire contents of which are incorporated herein by reference.

TECHNICAL FIELD

The disclosure relates to an automatic recharging method, a device, a storage medium and a system, and belongs to the field of computer technology.

BACKGROUND

With the continuous development of the intelligence, a self-moving apparatus (such as a cleaning robot, an intelligent lawn mower, etc.) can return to a charging base for charging after a period of use. On this occasion, the self-moving apparatus needs to determine the position of the charging base.

Currently, a method in which the self-moving apparatus determines the position of the charging base includes: transmitting a signal continuously by a charging base, and determining a position of the charging base on the basis of the signal after the self-moving apparatus receives the signal. The signal sent by the charging base includes infrared signal, ultrasonic signal, laser radar signal and so on.

However, the above signal may be easily interfered by environmental factors. On this occasion, a situation may arise that the self-moving apparatus cannot find the charging base.

SUMMARY

The disclosure provides an automatic recharging method, a device, a storage medium and a system, which may solve the problem that the automatic recharging device cannot find the charging base when positioning the charging base based on the signal. The technical solution is provided in the disclosure as follows:

according to a first aspect, an automatic recharging method is provided, which is used in an automatic recharging device, the automatic recharging device is provided with an image acquisition component, and the method may include:

starting the image acquisition component to acquire an automatic recharging image during an automatic recharging process;

determining, when the automatic recharging image contains a feature identification, a relative positional relationship between a charging surface of a charging base and the automatic recharging device based on a position of the feature identification in the automatic recharging image, wherein the feature identification is disposed on the charging base and displayed by the charging surface of the charging base, and the charging base is configured to charge the automatic recharging device;

determining a movement direction of the automatic recharging device based on the relative positional relationship, to make the automatic recharging device move toward the charging surface of the charging base.

Optionally, there are at least two feature identifications, and the determining, a relative positional relationship between a charging surface of a charging base and the automatic recharging device based on a position of the feature identification in the automatic recharging image, may comprise:

acquiring an installation position of the feature identification on the charging surface;

determining a distance and an angle between the charging surface and the automatic recharging device based on the position of the feature identification in the automatic recharging image and the installation position.

Optionally, there are at least two feature identifications, and the method may further comprise:

determining whether the automatic recharging image includes at least two feature identifications;

performing, when the automatic recharging image includes the at least two feature identifications, the step of the determining, a relative positional relationship between a charging surface of a charging base and the automatic recharging device based on a position of the feature identification in the automatic recharging image.

Optionally, there are at least two feature identifications, and the determining a distance and an angle between the charging surface and the automatic recharging device based on the position of the feature identification in the automatic recharging image and the installation position, comprises:

for each feature identification, determining a first vertical direction distance in a direction perpendicular to ground between the image acquisition component and the feature identification based on the installation position of the feature identification;

acquiring a second vertical direction distance in the direction perpendicular to the ground between an image position of the feature identification and an image center point of the automatic recharging image;

calculating the first direction distance in the traveling direction between the image acquisition component and the feature identification based on the first vertical direction distance, the second vertical direction distance and a focal length of the image acquisition component;

acquiring a second direction image distance in the direction parallel to the ground between the image position of the feature identification and the image center point of the automatic recharging image;

calculating the second direction distance in the direction parallel to the ground and perpendicular to the traveling direction between the image acquisition component and the feature identification, based on the first direction distance, the second direction image distance and the focal length of the image acquisition component;

determining the angle between the charging surface and the automatic recharging device, based on the first direction distance of each feature identification and the second direction distance of each feature identification.

Optionally, display positions of the at least two feature identifications displayed by the charging surface are the same or different in height relative to the ground; and/or, the display positions of the at least two feature identifications displayed by the charging surface are centrally symmetric.

Optionally, the starting the image acquisition component to acquire an automatic recharging image during an automatic recharging process, comprises:

starting the image acquisition component to acquire the automatic recharging image when power of the automatic recharging device is lower than a preset power value; or starting the image acquisition component to acquire the automatic recharging image when a charging command is received.

According to a second aspect, an automatic recharging device is provided, which is used in the automatic recharging device, the automatic recharging device is provided with an image acquisition component, and the device may include:

an image acquisition module, configured to start the image acquisition component to acquire an automatic recharging image during an automatic recharging process;

a position determining module, configured to, when the automatic recharging image contains a feature identification, determine a relative positional relationship between a charging surface of a charging base and the automatic recharging device based on a position of the feature identification in the automatic recharging image, wherein the feature identification is disposed on the charging base and displayed by the charging surface of the charging base, and the charging base is configured to charge the automatic recharging device;

a movement control module, configured to determine a movement direction of the automatic recharging device based on the relative positional relationship, to make the automatic recharging device move toward the charging surface of the charging base.

According to a third aspect, an automatic recharging device is provided, the device may include a processor and a memory; programs are stored in the memory, and the programs are loaded by the processor and configured to perform the automatic recharging method according to the first aspect.

According to a fourth aspect, a computer readable storage medium is provided, programs are stored in the memory, and the programs are loaded by a processor and configured to perform the automatic recharging method according to the first aspect.

According to a fifth aspect, a charging base is provided, the charging base is provided with a feature identification, to make an automatic recharging device start an image acquisition component to acquire an automatic recharging image including the feature identification during an automatic recharging process; determine a relative positional relationship between the charging base and the automatic recharging device based on a position of the feature identification in the automatic recharging image; and determine a movement direction of the automatic recharging device to the charging base based on the relative positional relationship.

According to a sixth aspect, an automatic recharging system is provided, the system may include an automatic recharging device and a charging base; the automatic recharging device includes an automatic recharging device according to the second aspect or the third aspect; the charging base includes a charging base according to the fifth aspect.

The beneficial effect of the disclosure is that an image acquisition component is started to acquire an automatic recharging image during an automatic recharging process; when the automatic recharging image contains a feature identification, a relative positional relationship between a charging surface of a charging base and the automatic recharging device is determined based on a position of the feature identification in the automatic recharging image; the feature identification is displayed by the charging surface of the charging base; and a movement direction of the automatic recharging device is determined based on the relative positional relationship, to make the automatic recharging device move toward the charging surface of the charging base, so that the problem that the automatic recharging device cannot find the charging base when positioning the charging base based on a signal can be solved. Due to disposing a feature identification on the charging surface of the charging base, the feature identification can be identified by the automatic recharging device to determine the relative positional relationship with the charging surface, which can ensure that the automatic recharging device can find the charging base, and can ensure that the automatic recharging device can determine the charging surface of the charging base at the same time, so as to improve the accuracy of the movement direction determined by the automatic recharging device.

The above description is only an overview of the technical solution of the disclosure. In order to have a better understanding of the technical means of the disclosure and to implement in accordance with the contents of the specification, some preferred embodiments of the disclosure will be described in detail hereinafter with reference to the drawings.

DETAILED DESCRIPTION OF THE EMBODIMENTS

A further detailed description is hereinafter given to the detailed description of the embodiments with reference to the drawings and embodiments. The following embodiments intend to illustrate the disclosure, but not to limit the scope of the disclosure.

Figure 1:
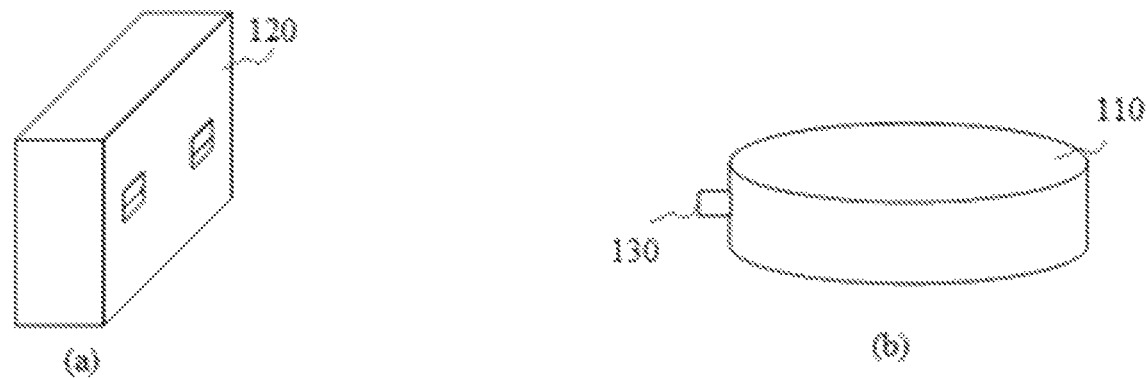
FIG. 1 is a structure schematic diagram illustrating an automatic recharging system according to an embodiment of the disclosure.

FIG. 1 is a structure schematic diagram illustrating an automatic recharging system according to an embodiment of the disclosure. As shown in FIG. 1, the system may at least include an automatic recharging device 110 (as shown in FIG. 1 (b)) and a charging base 120 (as shown in FIG. 1 (a)).

The automatic recharging device 110 refers to an apparatus with a function of finding a charging base automatically. The automatic recharging device 110 may be also called self-moving apparatus, self-moving robot and so on, and the name of the automatic recharging device 110 is not limited in the embodiments. The automatic recharging device 110 may include but not limited to a cleaning robot, an automated guided vehicle (AGV), and an intelligent lawn mower, etc., the type of the automatic recharging device 110 is not limited in the embodiments.

The charging base 120 is configured to charge the automatic recharging device 110. Optionally, the charging base 120 may charge the automatic recharging device 110 based on wired charging technology or wireless charging technology.

In this embodiment, an image acquisition component 130 is installed on the automatic recharging device 110, and the automatic recharging device 110 has a communication connection with the image acquisition component 130. A feature identification is disposed on the charging base 120, and on a charging surface of the charging base 120.

Herein, the charging surface refers to a surface on the charging base 120 that supplies power to the automatic recharging device 110.

Optionally, the feature identification may be disposed on the charging surface; or be disposed inside of the charging base 120, but may be displayed by the charging surface and be acquired by the image acquisition component 130. For example, the feature identification is a light emitting element, the light emitting element is disposed inside of the charging base 120, and the light emitted is emitted through the charging surface.

Figure 2:
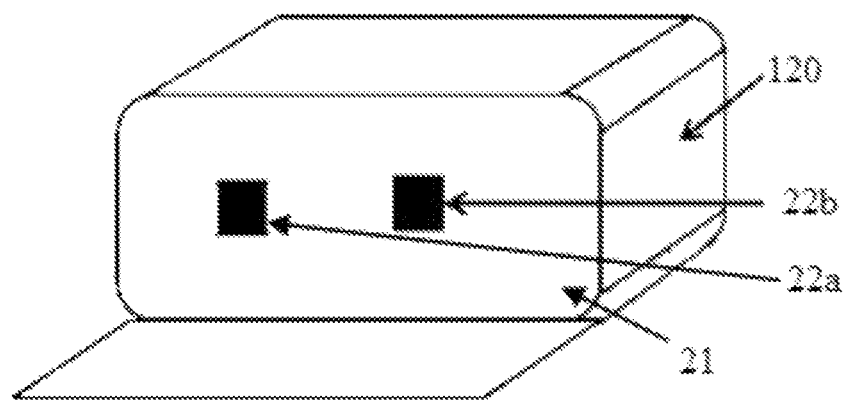
FIG. 2 is a structure diagram illustrating a charging base according to an embodiment of the disclosure.

The feature identification is configured to identify the charging surface of the charging base 120. Optionally, the feature identification may be represented by visual means such as optical signal (visible light signal emitted by LED, etc.) or preset patterns, and the implementation of the feature identification is not limited in the embodiments. Optionally, there are at least two feature identifications. Referring to the charging base 120 as shown in FIG. 2, on which two feature identifications including 22a and 22b are disposed.

Optionally, display positions of the two feature identifications displayed by the charging surface are the same or different in height relative to the ground; and/or, the display positions of the at least two feature identifications displayed by the charging surface are centrally symmetric. Taking FIG. 2 as an example, the display positions of the at least two feature identifications displayed by the charging surface are the same height relative to the ground, and centrally symmetric on the charging surface.

The automatic recharging device 110 is configured to start the image acquisition component 130 to acquire an automatic recharging image during an automatic recharging process.

Accordingly, the image acquisition component 130 is configured to acquire the automatic recharging image under the control of the automatic recharging device 110, and transmit the automatic recharging image to the automatic recharging device 110.

The automatic recharging device 110 is also configured to, after acquiring the automatic recharging image, determine a relative positional relationship between the charging surface of the charging base and the automatic recharging device based on the position of the feature identification in the automatic recharging image when the automatic recharging image includes the feature identification; and determine a movement direction of the automatic recharging device based on the relative positional relationship, so as to make the automatic recharging device 110 move toward the charging surface of the charging base 120.

The automatic recharging system provided in this embodiment may ensure that the automatic recharging device 110 can determine the charging surface of the charging base 120, by setting a feature identification on the charging surface of the charging base 120 and identifying the feature identification by the automatic recharging device 110 to determine the relative positional relationship with the charging surface, so as to improve the accuracy of the movement direction determined by the automatic recharging device 110.

Figure 3:
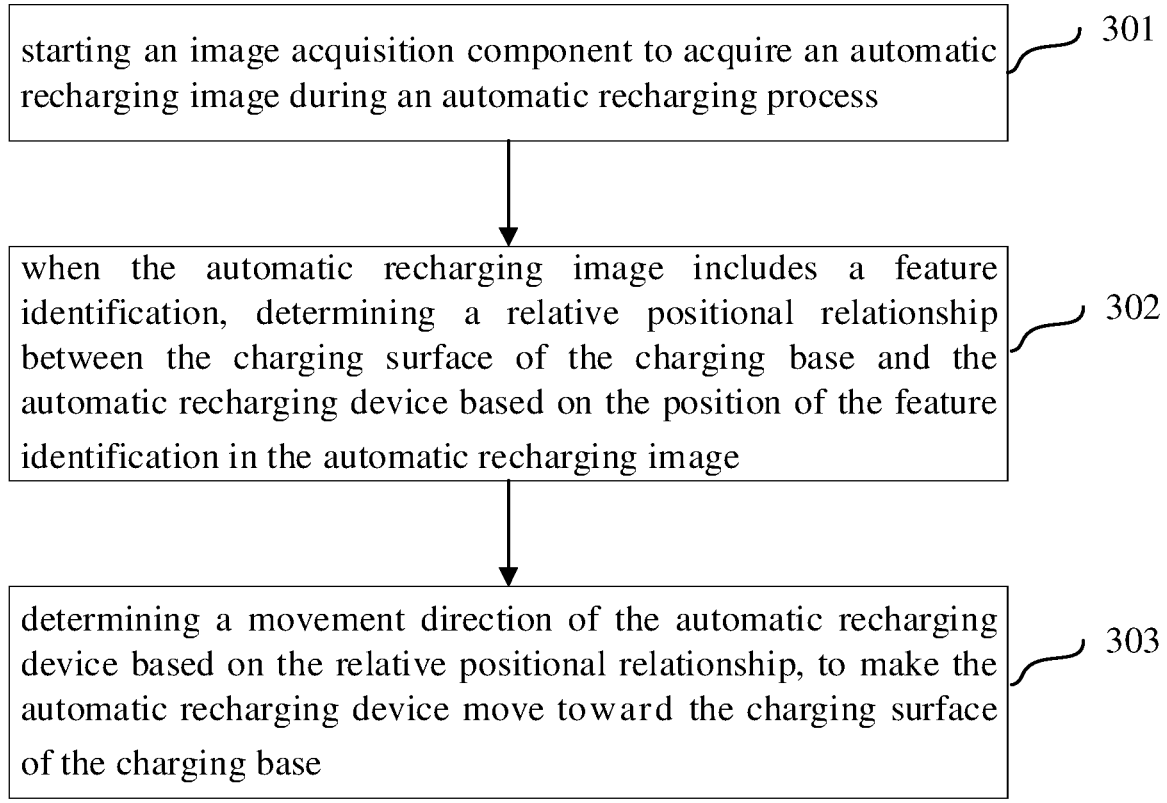
FIG. 3 is a flow diagram illustrating an automatic recharging method according to an embodiment of the disclosure.

FIG. 3 is a flow diagram illustrating an automatic recharging method according to an embodiment of the disclosure, this embodiment is illustrated by applying this method in the automatic recharging system as shown in FIG. 1, and the execution subject of each step is the automatic recharging device 110 in the system. The method includes at least the following steps.

Step 301, starting an image acquisition component to acquire an automatic recharging image during an automatic recharging process.

The automatic recharging process refers to a process in which an automatic recharging device searches for a charging base.

Optionally, when power of the automatic recharging device is lower than a preset power value, the image acquisition component is started to acquire the automatic recharging image; or when receiving a charging command, the image acquisition component is started to acquire the automatic recharging image. Of course, the automatic recharging device may also determine the timing of starting the automatic recharging process by other means, and this embodiment does not limit the means that the automatic recharging device determines the timing of starting the automatic recharging process.

Step 302, when the automatic recharging image contains a feature identification, determining a relative positional relationship between the charging surface of the charging base and the automatic recharging device based on the position of the feature identification in the automatic recharging image.

Wherein the feature identification is disposed on the charging base, and displayed by the charging surface of the charging base; and the charging base is configured to charge the automatic recharging device.

The determining a relative positional relationship between the charging surface of the charging base and the automatic recharging device based on the position of the feature identification in the automatic recharging image, includes: acquiring an installation position of the feature identification on the charging surface; and determining a distance and an angle between the charging surface and the automatic recharging device based on the position of the feature identification in the automatic recharging image and the installation position.

Based on similar triangle principle and based on the position of the feature identification in the automatic recharging image and the installation position, the automatic recharging device determines the distance and the angle between the charging surface and the automatic recharging device.

In an example, there are at least two feature identifications. In this case, for each feature identification, the automatic recharging device determines a first vertical direction distance in a direction perpendicular to the ground between the image acquisition component and the feature identification based on the installation position of the feature identification; acquires a second vertical direction distance in the direction perpendicular to the ground between an image position of the feature identification and an image center point of the automatic recharging image; calculates a first direction distance in a traveling direction between the image acquisition component and the feature identification based on the first vertical direction distance, the second vertical direction distance and a focal length of the image acquisition component; acquires a second direction image distance in a direction parallel to the ground between the image position of the feature identification and the image center point of the automatic recharging image; calculates a second direction distance in the direction parallel to the ground and perpendicular to the traveling direction between the image acquisition component and the feature identification based on the first direction distance, the second direction image distance and the focal length of the image acquisition component; and determines the angle between the recharging surface and the automatic recharging device based on the first direction distance of each feature identification and the second direction distance of each feature identification.

For the acquisition process of the first vertical direction distance, a height H1 of the image acquisition component relative to the ground and a height H2 of each feature identification relative to the ground are previously stored in the automatic recharging device (or a distances of each feature identification relative to the bottom of the charging surface and a distance of the bottom of the charging surface relative to the ground are previously stored, thus obtaining H2); and based on the difference between H1 and H2, the first vertical direction distance in the direction perpendicular to the ground between the image acquisition component and the feature identification may be obtained.

Optionally, the direction perpendicular to the ground also may be called such as height direction, z direction in this embodiment, and the name of the direction perpendicular to the ground is not limited in this embodiment.

The second vertical direction distance is the distance of the first vertical direction distance on the automatic recharging image after imaging through the image acquisition component.

For the acquisition process of the first direction distance, the focal length of the image acquisition component is previously stored in the automatic recharging device; due to the triangle formed by the focal length of the image acquisition component and the second vertical direction distance is similar to the triangle formed by the first direction distance and the first vertical direction distance, and based on the triangle similarity principle, the first direction distance may be calculated based on the first vertical direction distance, the second vertical direction distance and the focal length of the image acquisition component.

Optionally, the traveling direction also may be called such as horizontal acquisition direction of the image acquisition component, y direction in this embodiment, and the name of the traveling direction is not limited in this embodiment.

The second direction image distance is the distance of the second direction distance on the automatic recharging image after imaging through the image acquisition component.

For the acquisition process of the second direction distance, due to the triangle formed by the focal length of the image acquisition component and the second direction image distance is similar to the triangle formed by the first direction distance and the second direction distance, and based on the triangle similarity principle, the second direction distance may be calculated based on the first direction distance, the second direction image distance and the focal length of the image acquisition component.

Optionally, the direction parallel to the ground and perpendicular to the traveling direction also may be called such as x direction in this embodiment, and the name of the direction perpendicular to the traveling direction is not limited in this embodiment.

The determining the angle between the charging surface and the automatic recharging device based on the first direction distance of each feature identification and the second direction distance of each feature identification, may be represented by the following formula:

$$\tan \alpha = S/L;$$

$$S = ((X1*S2) + (X2*S1))/(X1+X2);$$

$$L = ((X1*L2) + (X2*L1))/(X1+X2);$$

Here, $\alpha$ represents the angle between the charging surface and the automatic recharging device, for any two feature identifications of multiple feature identifications, X1 represents the distance between any feature identification and the central axis of the charging surface, L1 represents the first direction distance of the feature identification, and S1 represents the second direction distance of the feature identification; X2 represents the distance between another feature identification and the central axis of the charging surface, L2 represents the first direction distance of the another feature identification, and S2 represents the second direction distance of the another feature identification; L represents the first direction distance between the charging surface and the automatic recharging device; and S represents the second direction distance between the charging surface and the automatic recharging device.

Figure 4:
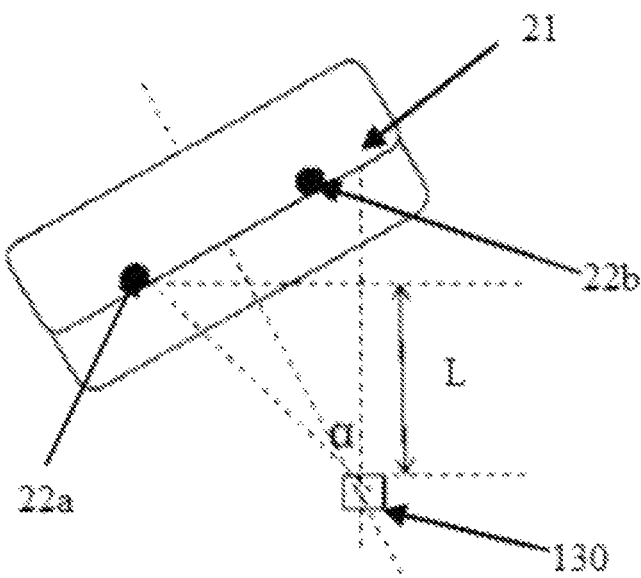
FIG. 4 is a schematic diagram illustrating a relative positional relationship between a charging surface and an automatic recharging device according to an embodiment of the disclosure.

Referring to the schematic diagram illustrating a positional relationship between the charging surface 21 and the image acquisition component 130 in the automatic recharging device. There are two feature identifications 22a and 22b disposed on the charging surface 21. Based on the schematic diagram in FIG. 4, the positional relationship between the charging surface 21 and the image acquisition component 130 may be equivalent to the positional relationship shown in FIG. 5, wherein a represents the angle between the charging surface and the image acquisition component in the automatic recharging device; L represents the first direction distance between the charging surface and the image acquisition component in the automatic recharging device; and S represents the second direction distance between the charging surface and the automatic recharging device.

Wherein the display positions of feature identifications 22a and 22b displayed through charging surface 21 are centrally symmetric, on this occasion, L is approximately to the average value of the first direction distance from the image acquisition component to each feature identification; and S is approximately to the average value of the second direction distance from the image acquisition component to each feature identification.

Figure 5:
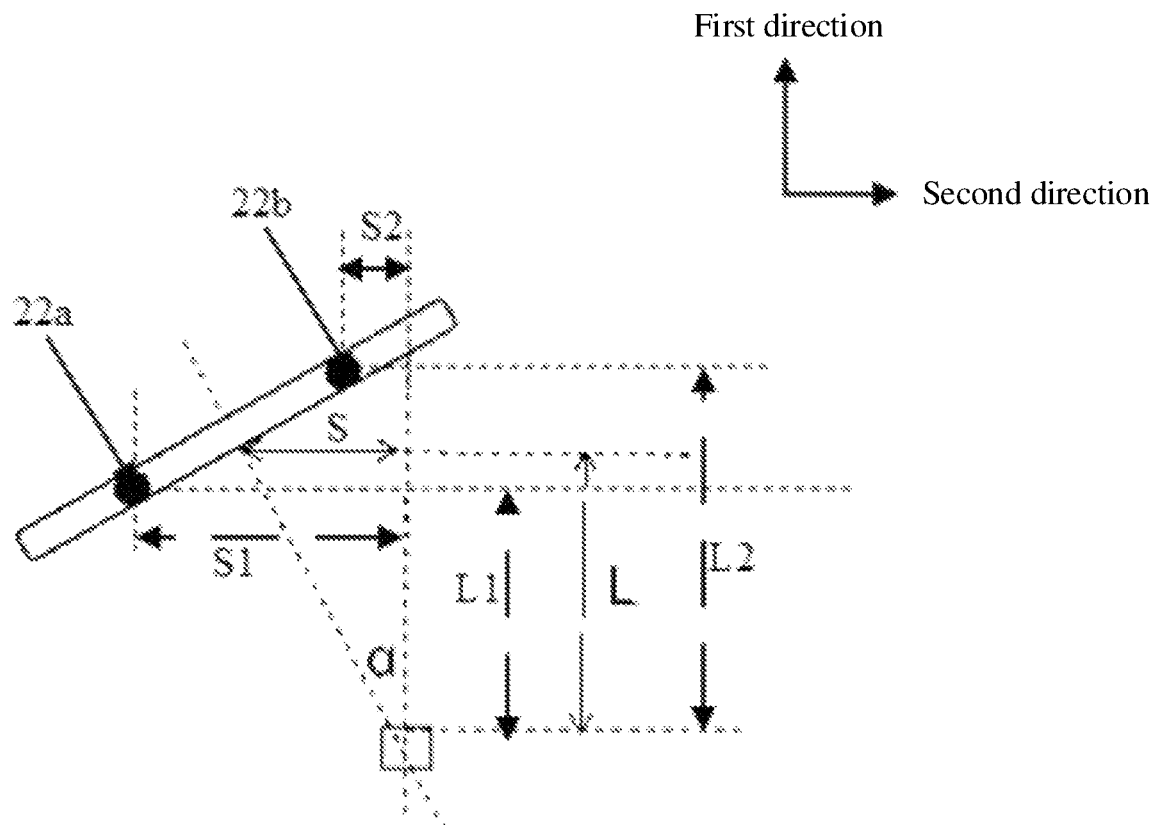
FIG. 5 is a schematic diagram illustrating a relative positional relationship between a charging surface and an automatic recharging device according to another embodiment of the disclosure.

Referring to FIG. 5, for example, there are two feature identifications, $$L=(L1+L2)/2; S=(S1+S2)/2.$$

Wherein L1 represents the first direction distance between the image acquisition component and the left-hand feature identification 22a; L2 represents the first direction distance between the image acquisition component and the right-hand feature identification 22b; S1 represents the second direction distance between the image acquisition component and the left-hand feature identification 22a; and S2 represents the second direction distance between the image acquisition component and the right-hand feature identification 22b.

Figure 6:
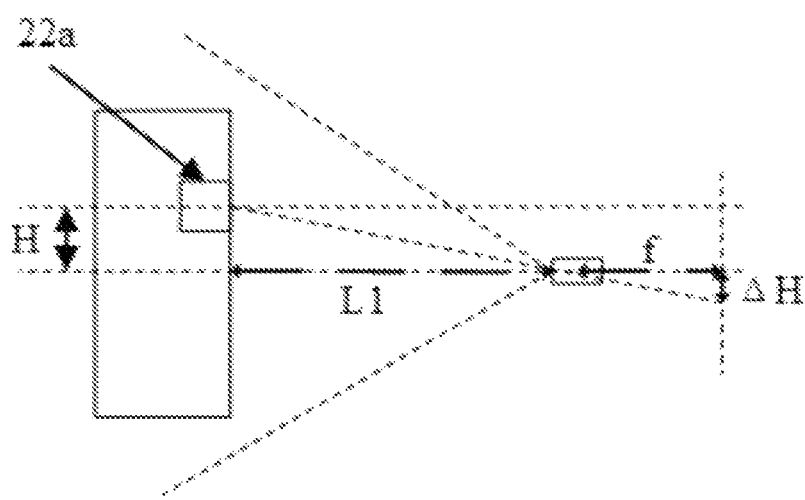
FIG. 6 is a schematic diagram illustrating a relative positional relationship between a charging surface and an automatic recharging device according to another embodiment of the disclosure.

For each feature identification, take acquiring L1 and S1 of the left-hand feature identification 22a as an example, and refer to the schematic diagram illustrating a relative positional relationship between the left view of the charging base and the image acquisition component as shown in FIG. 6. Based on the installation position of at least two feature identifications on the charging surface and the height of the image acquisition component, the first vertical direction distance H (i.e., the distance perpendicular to the ground) between the image acquisition component and the left-hand feature identification 22a may be determined. The automatic recharging device may determine the second vertical direction distance ΔH (i.e., in the direction the image acquisition box perpendicular to the ground) between the image position of the left-hand feature identification 22a and the image center point of the automatic recharging image from the automatic recharging image. The focal length f of the image acquisition component is known, and the following formula may be obtained based on the triangle similarity principle:

$$L1=H\times f/\Delta H.$$

Referring to the schematic diagram illustrating a relative positional relationship between the left-hand feature identification 22a of the top view of the charging base and the image acquisition component. The following formula may be obtained based on the triangle similarity principle:

$$S1=L1\times \Delta S/f.$$

Figure 7:
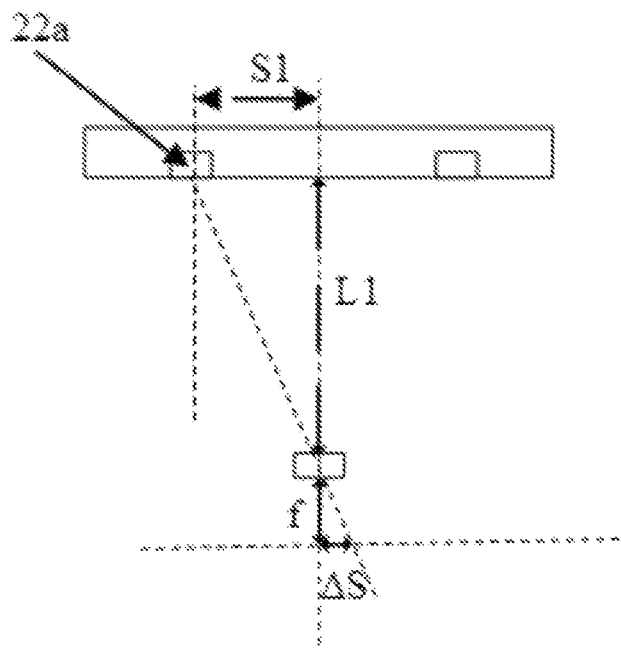
FIG. 7 is a schematic diagram illustrating a relative positional relationship between a charging surface and an automatic recharging device according to another embodiment of the disclosure.

The method for acquiring L2 and S2 is the same as that in FIG. 6 and FIG. 7, and it will not be repeated in this embodiment.

Optionally, when there are at least two feature identifications, the automatic recharging device determines whether the automatic recharging image includes at least two feature identifications; and this step may be performed if the automatic recharging image includes at least two feature identifications, else the step 301 may be performed again when the automatic recharging image does not include at least two feature identifications.

In another example, there are at least two feature identifications. On this occasion, when the automatic recharging image includes one feature identification, calculating the first direction distance between the image acquisition component and the feature identification based on the first vertical direction distance from the image acquisition component to the feature identification, the second vertical direction distance between the feature identification and the image central point of the automatic recharging image, and the focal length of the image acquisition component; acquiring the second direction image distance in the direction parallel to the ground between the image position of the feature identification and the image center point of the automatic recharging image; calculating the second direction distance in the direction parallel to the ground and perpendicular to the traveling direction between the image acquisition component and the feature identification based on the first direction distance, the second direction image distance and the focal length of the image acquisition component; determining an initial angle between the charging surface and the automatic recharging device according to the first direction distance and the second direction distance; controlling the self-moving apparatus to rotate according to the initial angle and move according to the first direction distance and the second direction distance; and after moving to the charging surface, controlling the self-moving apparatus to move and rotate to match the charging interface on the charging base, to obtain a final distance and final angle.

Optionally, when the automatic recharging image does not include an image of the charging base, the automatic recharging device may detect whether the automatic recharging image includes the image of obstacles; if the automatic recharging image includes the image of obstacles, the automatic recharging device may be controlled to bypass the obstacles corresponding to the image of obstacles; and the step 301 may be performed again.

Step 303, determining a movement direction of the automatic recharging device based on the relative positional relationship, to make the automatic recharging device move toward the charging surface of the charging base.

In summary, the automatic recharging method provided in this embodiment may start the image acquisition component to acquire an automatic recharging image during an automatic recharging process; when the automatic recharging image contains a feature identification, may determine the relative positional relationship between the charging surface of the charging base and the automatic recharging device based on the position of the feature identification in the automatic recharging image; the feature identification is displayed by the charging surface of the charging base, which is configured to charge the automatic recharging device; determine the movement direction of the automatic recharging device based on the relative positional relationship, so as to make the automatic recharging device move toward the charging surface of the charging base. Therefore, the problem that the automatic recharging device cannot find the charging base when positioning the charging base based on the signal may be solved. Due to disposing the feature identification on the charging surface of the charging base, and the automatic recharging device can identify the feature identification to determine the relative positional relationship with the charging surface, which can ensure that the automatic recharging device can find the charging base, and at the same time, the automatic recharging device can determine the charging surface of the charging base, and improve the accuracy of the moving direction determined by the automatic recharging device.

Figure 8:
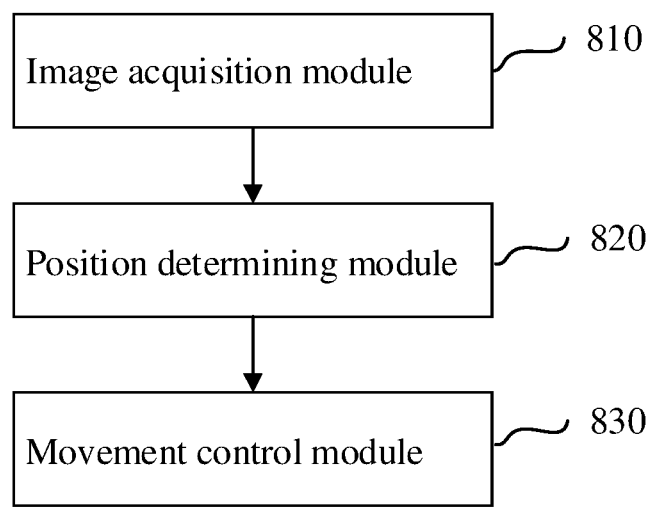
FIG. 8 is a block diagram illustrating an automatic recharging device according to an embodiment of the disclosure.

FIG. 8 is a block diagram illustrating an automatic recharging device according to an embodiment of the disclosure, this embodiment is illustrated by applying the device to the automatic recharging device 110 in the automatic recharging system shown in FIG. 1. The device at least includes the following modules: an image acquisition module 810, a position determining module 820, and a movement control module 830.

The image acquisition module 810 is configured to start the image acquisition component to acquire automatic recharging image during an automatic recharging process;

the position determining module 820 is configured to, when the automatic recharging image contains a feature identification, determine a relative positional relationship between a charging surface of a charging base and the automatic recharging device based on the position of the feature identification in the automatic recharging image; the feature identification is disposed on the charging surface of the charging base, and displayed by the charging surface of the charging base; and the charging base is configured to charge the automatic recharging device;

the movement control module 830 is configured to determine a movement direction of the automatic recharging device based on the relative positional relationship, to make the automatic recharging device move toward the charging surface of the charging base.

The related details may refer to the above method embodiments.

It should be noted that the automatic recharging device provided in this embodiment only takes the above functional modules division as an example to illustrate when carrying out a process of automatic recharging. In practical application, the above functions may be assigned to different functional modules as necessary, in other words, the internal structure of the automatic recharging device may be divided into different functional modules, to complete all or part of the functions described above. In addition, the automatic recharging device and the automatic recharging method provided in above embodiments belong to the same conception, and the specific implementation process may refer to the embodiments illustrating the method, which will not be described here.

Figure 9:
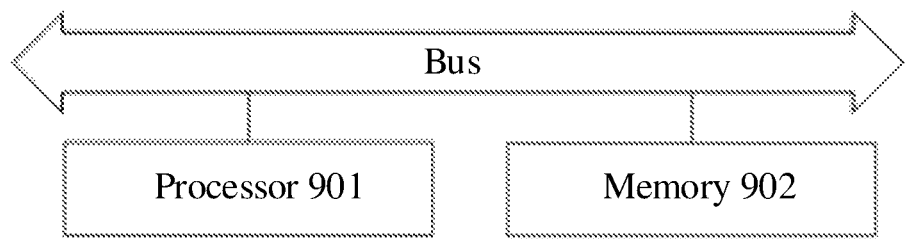
FIG. 9 is a block diagram illustrating an automatic recharging device according to an embodiment of the disclosure.

FIG. 9 is a block diagram illustrating an automatic recharging device according to an embodiment of the disclosure, the device may be an automatic recharging device 110 in the automatic recharging system shown in FIG. 1. The device at least includes a processor 901 and a memory 902.

The processor 901 may include one or more processing cores, for example, a 4-core processor, an 8-core processor, etc. The processor 901 may be implemented by adopt at least one hardware form such as DSP (Digital Signal Processing), FPGA (Field-Programmable Gate Array) or PLA (Programmable Logic Array). The processor 901 may also include a main processor and a co-processor, the main processor is a processor configured to process the data in the wake state, which is also known as CPU (Central Processing Unit); and the co-processor is a low-power processor configured to process the data in standby state. In some embodiments, the processor 901 may be integrated with a GPU (Graphics Processing Unit), which is configured to render and draw the content required for the display screen. In some embodiments, processor 901 may also include an AI (Artificial Intelligence) processor, which is configured to handle computational operations related to machine learning.

The memory 902 may include one or more computer readable storage media, and the computer readable storage media may be non-transient. The memory 902 may also include high-speed random access memory, and non-volatile memory, such as one or more disk storage devices, and flash storage devices. In some embodiments, the non-transient computer-readable storage media in the memory 902 are configured to store at least one instruction, and the instruction is executed by the processor 901 to implement the automatic recharging method provided in the embodiments illustrating the method in this disclosure.

In some embodiments, the automatic recharging device may also optionally include a peripheral interface and at least one peripheral. The processor 901, the memory 902 and the peripheral interface may be connected through a bus or a signal line. Each peripheral may be connected to the peripheral interface through a bus, a signal line, or a circuit board. Illustratively, the peripheral includes, but are not limited to, radio frequency circuits, touch display screens, audio circuits, and power supplies.

Of course, the automatic recharging device may also include fewer or more components, which is not limited in this embodiment.

Optionally, a computer readable storage medium is also provided in this disclosure, the computer readable storage medium stores programs, and the programs are loaded and executed by a processor to implement an automatic recharging method of the embodiments illustrating the method above.

Optionally, a computer product is also provided in this disclosure, the computer product includes a computer readable storage medium, the computer readable storage medium stores programs, and the programs are loaded and executed by a processor to implement an automatic recharging method of the embodiments illustrating the method above.

In addition, a charging base is also provided in this disclosure, and the charging base is provided with a feature identification, to enable the automatic recharging device to start the image acquisition component to acquire the automatic recharging image including the feature identification during an automatic recharging process; determine the relative positional relationship between the charging base and the automatic recharging device based on the position of the feature identification in the automatic recharging image; and determine the movement direction of the automatic recharging device moving to the charging base based on the relative positional relationship.

The technical features of the above embodiments may be combined in any way, and for brevity of the description, all possible combinations of the technical features of the above embodiments have not been described. However, as long as there is no contradiction in the combination of these technical features, they shall be considered to be within the scope of this specification.

The above embodiments represent only several implementations of this disclosure, which are described relatively specific and detailed, but cannot be construed as a limitation on the scope of the invention patent. It should be noted that, without deviating from the conception of this disclosure, there are a number of variations and improvements may be made to the persons having ordinary skill in the art, and these shall be within the protection scope of this disclosure. Therefore, the scope of protection of this disclosure patent shall be subject to the attached claims.

What is claimed is:

1. An automatic recharging method, wherein the method is used in an automatic recharging device, the automatic recharging device is provided with an image acquisition component, and the method comprises:

acquiring, by the image acquisition component, an automatic recharging image during an automatic recharging process;

determining, by a processor, a first direction distance in a traveling direction of the automatic recharging device between the image acquisition component and the feature identification, based on a first vertical direction distance, a second vertical direction distance and a focal length of the image acquisition component, wherein the first vertical direction distance is a difference between H1 and H2, H1 is a height of the image acquisition component relative to a ground, and H2 is a height of a feature identification relative to the ground, and the second vertical direction distance is a distance between an image position of the feature identification and an image center point of the automatic recharging image in a direction perpendicular to the ground, when the automatic recharging image contains a feature identification, wherein the feature identification is disposed on the charging base and displayed by the charging surface of the charging base, and the charging base is configured to charge the automatic recharging device;

determining, by the processor, a second direction distance in a direction parallel to ground and perpendicular to the traveling direction between the image acquisition component and the feature identification, based on the first direction distance, a second direction image distance and the focal length of the image acquisition component, wherein the second direction image distance is a distance between the image position of the feature identification and the image center point of the automatic recharging image in a direction parallel to the ground;

determining, by the processor, a relative positional relationship between the charging surface of the charging base and the automatic recharging device based on the first direction distance and the second direction distance; and moving toward the charging surface of the charging base along a movement direction determined based on the relative positional relationship.

2. The method of claim 1, wherein the determining, by the processor, a relative positional relationship between the charging surface of the charging base and the automatic recharging device based on the first direction distance and the second direction distance comprises:

determining, by the processor, a distance and an angle between the charging surface and the automatic recharging device based on the first direction distance and the second direction distance, wherein the moving toward the charging surface of the charging base along a movement direction determined based on the relative positional relationship comprises:

moving toward the charging surface of the charging base along a movement direction determined based on the distance and the angle between the charging surface and the automatic recharging device.

3. The method of claim 1, wherein there are at least two feature identifications, and the method further comprises:

determining whether the automatic recharging image includes the at least two feature identifications; and performing, when the automatic recharging image includes the at least two feature identifications, the step of the determining the first direction distance and the second direction distance.

4. The method of claim 2, wherein there are at least two feature identifications, and the determining, by the processor, a distance and an angle between the charging surface and the automatic recharging device based on the first direction distance and the second direction distance comprises:

determining, by the processor, the distance and the angle between the charging surface and the automatic recharging device, based on the first direction distance of each feature identification of the at least two feature identifications, and the second direction distance of each feature identification of the at least two feature identifications.

5. The method of claim 1, wherein there are at least two feature identifications, and display positions of the at least two feature identifications displayed by the charging surface are the same or different in height relative to the ground.

6. The method of claim 1, wherein there are at least two feature identifications, and display positions of the at least two feature identifications displayed by the charging surface are centrally symmetric.

7. The method of claim 1, wherein the acquiring, by the image acquisition component, an automatic recharging image during an automatic recharging process comprises:

acquiring, by the image acquisition component, the automatic recharging image when power of the automatic recharging device is lower than a preset power value.

8. The method of claim 1, wherein the acquiring, by the image acquisition component, an automatic recharging image during an automatic recharging process comprises:

acquiring, by the image acquisition component, the automatic recharging image when receiving a charging command.

9. An automatic recharging device, wherein the automatic recharging device is provided with an image acquisition component, and the device comprises a processor and a memory; programs are stored in the memory, and the programs are loaded by the processor and configured to perform the following operations:

acquiring, an automatic recharging image during an automatic recharging process;

determining, a first direction distance in a traveling direction of the automatic recharging device between the image acquisition component and the feature identification, based on a first vertical direction distance, a second vertical direction distance and a focal length of the image acquisition component, wherein the first vertical direction distance is a difference between $H1$ and $H2$, $H1$ is a height of the image acquisition component relative to a ground, and $H2$ is a height of a feature identification relative to the ground, and the second vertical direction distance is a distance between an image position of the feature identification and an image center point of the automatic recharging image in a direction perpendicular to the ground, when the automatic recharging image contains a feature identification, wherein the feature identification is disposed on the charging base and displayed by the charging surface of the charging base, and the charging base is configured to charge the automatic recharging device;

determining, by the processor, a second direction distance in a direction parallel to ground and perpendicular to the traveling direction between the image acquisition component and the feature identification, based on the first direction distance, a second direction image distance and the focal length of the image acquisition component, wherein the second direction image distance is a distance between the image position of the feature identification and the image center point of the automatic recharging image in a direction parallel to the ground;

determining a relative positional relationship between the charging surface of the charging base and the automatic recharging device based on the first direction distance and the second direction distance; and controlling the automatic recharging device toward the charging surface of the charging base along a movement direction determined based on the relative positional relationship.

10. The device of claim 9, wherein the processor is configured to perform the following operations:
   determining a distance and an angle between the charging surface and the automatic recharging device based on the first direction distance and the second direction distance; and
   controlling the automatic recharging device toward the charging surface of the charging base along a movement direction determined based on the distance and the angle between the charging surface and the automatic recharging device.

11. The device of claim 9, wherein there are at least two feature identifications, and the processor is configured to perform the following operations:
   determining whether the automatic recharging image includes the at least two feature identifications; and
   performing, when the automatic recharging image includes the at least two feature identifications, the step of the determining the first direction distance and the second direction distance.

12. The device of claim 9, wherein there are at least two feature identifications, and
   display positions of the at least two feature identifications displayed by the charging surface are the same or different in height relative to the ground.

13. The device of claim 9, wherein the processor is configured to perform the following operations:
   starting the image acquisition component to acquire the automatic recharging image when power of the automatic recharging device is lower than a preset power value.

14. The device of claim 9, wherein the processor is configured to perform the following operations:
   starting the image acquisition component to acquire the automatic recharging image when receiving a charging command.

15. A non-transitory computer readable storage medium, wherein programs are stored in the storage medium, and the programs are executed by a processor to perform the following operations:
   acquiring, an automatic recharging image during an automatic recharging process;
   determining, a first direction distance in a traveling direction of the automatic recharging device between the image acquisition component and the feature identification, based on a first vertical direction distance, a second vertical direction distance and a focal length of the image acquisition component, wherein the first vertical direction distance is a difference between H1 and H2, H1 is a height of the image acquisition component relative to a ground, and H2 is a height of a feature identification relative to the ground, and the second vertical direction distance is a distance between an image position of the feature identification and an image center point of the automatic recharging image in a direction perpendicular to the ground, when the automatic recharging image contains a feature identification, wherein the feature identification is disposed on the charging base and displayed by the charging surface of the charging base, and the charging base is configured to charge the automatic recharging device;
   determining, by the processor, a second direction distance in a direction parallel to ground and perpendicular to the traveling direction between the image acquisition component and the feature identification, based on the first direction distance, a second direction image distance and the focal length of the image acquisition component, wherein the second direction image distance is a distance between the image position of the feature identification and the image center point of the automatic recharging image in a direction parallel to the ground;
   determining a relative positional relationship between the charging surface of the charging base and the automatic recharging device based on the first direction distance and the second direction distance; and
   controlling the automatic recharging device toward the charging surface of the charging base along a movement direction determined based on the relative positional relationship.

16. The storage medium of claim 15, wherein the programs are executed by the processor to perform the following operations:
   determining a distance and an angle between the charging surface and the automatic recharging device based on the first direction distance and the second direction distance; and
   controlling the automatic recharging device toward the charging surface of the charging base along a movement direction determined based on the distance and the angle between the charging surface and the automatic recharging device.

17. The storage medium of claim 15, wherein there are at least two feature identifications, and the programs are executed by the processor to perform the following operations:
   determining whether the automatic recharging image includes the at least two feature identifications; and
   performing, when the automatic recharging image includes the at least two feature identifications, the step of the determining the first direction distance and the second direction distance.

18. An automatic recharging system, wherein the system comprises an automatic recharging device and a charging base;
   the automatic recharging device comprises the automatic recharging device according to claim 9; and
   the charging base is disposed with a feature identification.

19. The method of claim 1, wherein the first direction distance is determined based on the following formula:

$$L1 = H \times f / \Delta H;$$

the second direction distance is determined based on the following formula:

$$S1 = L1 \times \Delta S / f,$$

wherein L1 represents the first direction distance, H represents the difference between H1 and H2, f represents the focal length of the image acquisition component, $\Delta H$ represents the second vertical direction distance, S1 represents the second direction distance, and $\Delta S$ represents the second direction image distance.

20. The device of claim 9, wherein the first direction distance is determined based on the following formula:

$$L1 = H \times f / \Delta H;$$

the second direction distance is determined based on the following formula:

$$S1 = L1 \times \Delta S / f,$$

wherein L1 represents the first direction distance, H represents the difference between H1 and H2, f represents the focal length of the image acquisition component, ΔH represents the second vertical direction distance, S1 represents the second direction distance, and ΔS represents the second direction image distance.

* * * * *